Aug. 27, 1963 P. J. MADON 3,101,919
STABILIZED CAPTIVE FLYING PLATFORM UNIT
Filed Sept. 19, 1962 3 Sheets-Sheet 3
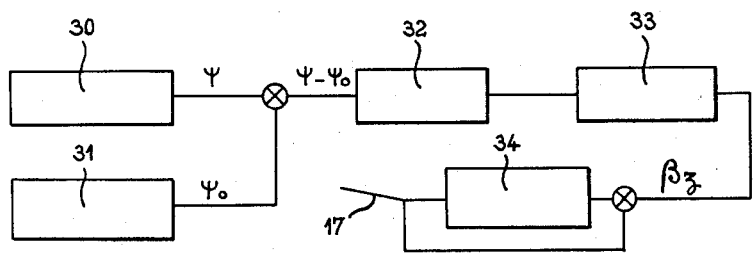
*fig.*3
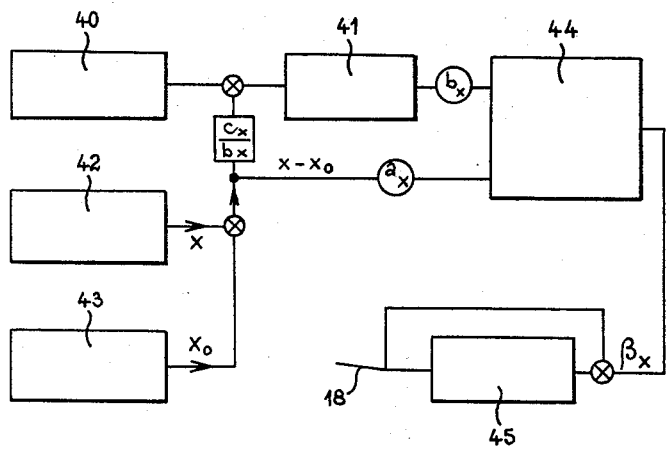
*fig.*4

United States Patent Office 3,101,919
Patented Aug. 27, 1963

3,101,919
STABILIZED CAPTIVE FLYING PLATFORM UNIT
Pierre Jean Madon, Antony, France, assignor to Nord-Aviation Societe Nationale de Constructions Aeronautiques, Paris, France, a joint-stock company of France
Filed Sept. 19, 1962, Ser. No. 224,796
Claims priority, application France Feb. 1, 1962
5 Claims. (Cl. 244—77)

The present invention relates to a stabilized captive flying platform unit, more particularly intended for carrying observation or transmission apparatus.

In the case where a platform of this kind carries observation apparatus, it is essential that it should only move slightly or very slowly under the effects of atmospheric disturbances. The localization of an objective is in fact easier and more accurate when the movement of the point of observation is a minimum. In addition, the estimation of the speed of the objective is only possible if the speed of the point of observation remains small as compared with that of the objective. In particular, when it is a matter of detecting the movements of a man on the ground, it is essential that the speeds of the platform from which the observation is made should not exceed a few tenths of a metre per second.

The known flying observation devices do not satisfy these conditions. Captive balloons, kites, helicopters, are all very sensitive to variations of wind; some of these are not even stable. Automatic pilots have in fact been produced for helicopters, but on the one hand they do not permit the speed to be reduced under the conditions indicated above, and on the other hand they necessitate the presence of a human pilot on board.

Applicant has knowledge of a type of aerodynically-lifted platform which is coupled to a rigid frame pivoting about a fixed point with respect to the ground by a system of three parallel metal cables of equal length and not located in the same plane. While platforms of this type have in fact an inherent stability by reason of their shape, their movements with respect to the ground under the influence of variations of wind still remain however at a value which is too high for the utilization contemplated above.

In consequence, the present invention has for its object a stabilized flying platform unit the displacements of which with respect to the ground remain very small, irrespective of the atmospheric disturbances encountered.

A free flying platform, like any body in space, has six degrees of freedom. If its displacements are marked with respect to a tri-rectangular trihedron $0\ x\ y\ z$ which is coupled to it, these six degrees of freedom can be represented by three translations $x$, $y$, $z$, along the three axes $Ox$, $Oy$ and $Oz$ and by three rotations $\theta$ $\phi$ and $\psi$ about each of these three axes.

Theoretically, the platform can be stabilized by applying on the three axes $Ox$, $Oy$ and $Oz$, forces and moments equal and opposite to those which tend to cause its movement.

The present invention has for its object an approximate solution of this problem which comprises:

Maintaining the platform practically horizontal at a given altitude, which partically eleminates $z$, $\theta$ and $\phi$;

Limiting to the maximum extent the speed of its horizontal displacements, translations $x$ and $y$ and rotation $\psi$.

The stabilized flying platform unit is of the type comprising aerodynamic lifting means, a base on the ground to which it is coupled by a system of at least three parallel metal cables of equal length and not in the same plane. It is essentially characterized by a rigid base fixed with respect to the ground, the fixing points of the three metal cables on the said base and one the said platform being respectively in a horizontal plane, thus practically eliminating three degrees of freedom of the said platform, namely a translation upwards and a rotation about each of the two axes perpendicular to each other in the said horizontal plane of the platform, means for detecting the displacements corresponding to the remaining three degrees of freedom of the said platform, namely a rotation about an axis perpendicular to the said horizontal plane and a translation along two axes perpendicular to each other in the said horizontal plane, control surfaces to act in opposition respectively to these three possible displacements; controls between each of the said control surfaces acting in dependence on the said means for detecting corresponding displacements, the said control surfaces thus acting practically in opposition to those displacements which remain possible.

In a preferred form of construction, the platform in accordance with the invention, lifted by a faired airscrew with a vertical shaft, comprises essentially:

Control surfaces constituted on the one hand by radial compensating flaps located on the path of the air set into motion by the air-screw, acting in opposition to the couple which is applied on the platform around the axis of the air-screw, and by two sets of stabilizing flaps acting respectively in opposition to the two perpendicular translations in the plane of the platform, the flaps of each of these sets being parallel to each other and perpendicular to those of the other set, the stabilizing flaps being all located on the path of the air delivered by the faired air-screw;

An automatic pilot, a group of means for detecting the displacements corresponding to the three degrees of freedom of the platform and controlling means coupling the said detection means to the control surfaces concerned, this automatic pilot comprising a yaw pilot and two other pilots identically the same as each other, one called the pitching pilot and the other the rolling pilot.

The yaw pilot is essentially composed of a course detector giving the coure $\psi$ and of the manual control giving the course to be kept $\psi_0$, a phase-advance network receiving the difference $\psi-\psi_0$ and delivering a signal which, after amplification, supplies a servo-motor actuating the compensating flaps.

The pitching or rolling pilots are identical and each of them is essentially composed of an accelerometer and two integrators supplying the speed and the displacement of the platform from the detected acceleration, a calculator proportioning and adding these three signals and supplying a turning angle to the stabilizing flaps concerned.

An optical detection system for the position of the platform with respect to the ground can be used to supply the displacements of the said platform with respect to the desired position. To this detection there may be added a manual control of course from the ground, permitting the preparation on board of the turning angles which are a function of the sign and direction of the deviations detected.

Other features and advantages will be brought out in the description which follows below of one form of embodiment of the invention, reference being made to the accompanying drawings, in which:

FIG. 3 is a diagram of the yaw pilot;

FIG. 4 is a diagram of the rolling or pitching pilot.

Figure 1:
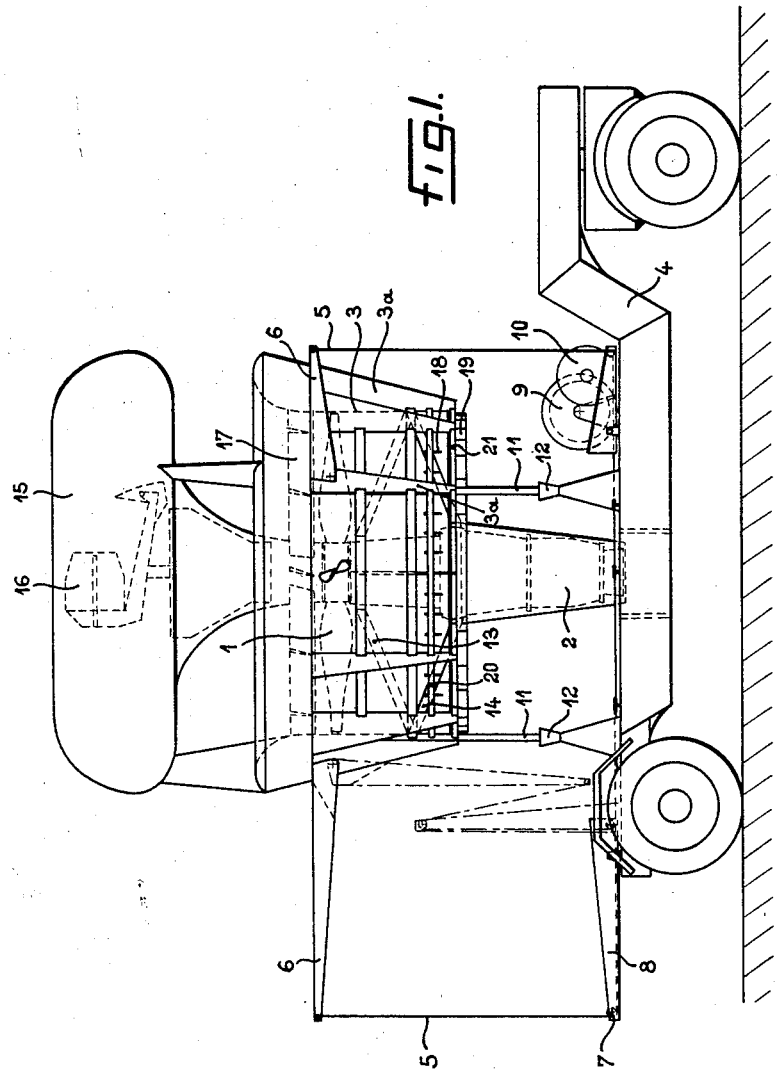
FIG. 1 is a view in elevation of the flying platform unit according to the invention, in the "on the ground" or "travelling" position on a semi-trailer.
Figure 2:
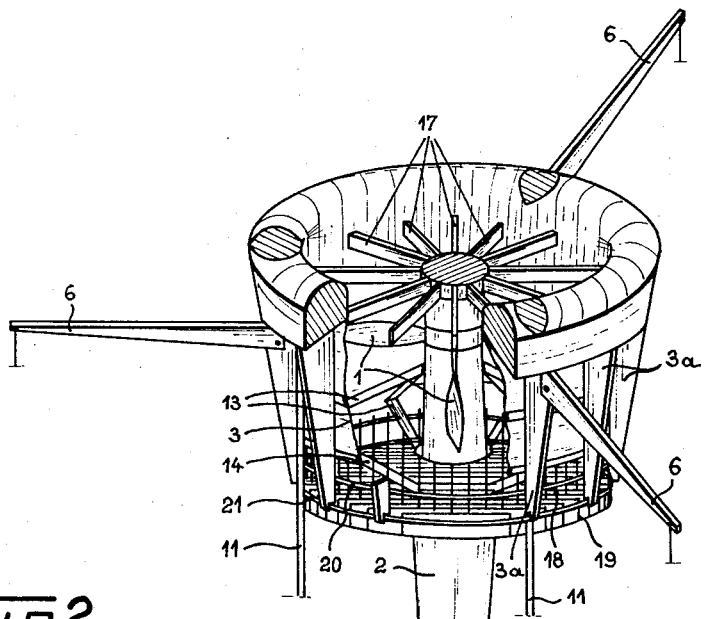
FIG. 2 is a perspective view with parts broken away, of the flying platform.

In FIGS. 1 and 2, the stabilized flying platform is constituted by an air-screw 1 driven by a prop-jet unit 2 in a fairing 3, the rigidity of which is ensured by the supports 3a. It is coupled to a semi-trailer 4 by means of three metal cables 5, each of them being fixed, on the one hand to the free extremity of one of the three foldable suspension arms 6 fixed to the fairing 3, and on the other hand passing over a pulley 7 fixed at the extremity of one of the three foldable retaining arms 8, fixed to the trailer 4. The free extremity of the cables 5 is wound on a winch 9 driven by a motor 10.

The suspension arms 6 and retaining arms 8, together with the cable 5 and the pulley 7 corresponding are shown, in the folded position, in chain-dotted lines in FIG. 1.

In position on the ground (see FIG. 1) the fairing 2 is immobilized with respect to the trailer 4 by means of three rods 11 rigidly fixed to the fairing 2, the free extremity of which is engaged in a cup 12 fixed on the trailer 4.

The prop-jet unit 2, coaxial with the air-screw 1 and its fairing 3, is coupled to the fairing by two sets of stays 13 and 14.

In the present example, the useful load is represented by a radar apparatus, of which the radome 15 and the aerial 16 can be seen in FIG. 1, the radar apparatus itself not being shown.

The stabilized flying platform is completed by axial compensating flaps 17, arranged between the fairing 3 and the housing of the prop-jet 2, above the air-screw 1. The flaps may be inclined with respect to the axis of the air-screw by means of any known type of control device which is in turn operated by the yaw pilot (the latter being shown diagrammatically in FIG. 3, the control device not being shown).

Similarly, a double set of stabilizing flaps 18 and 19 are provided in the extension of the fairing 3, beneath the air-screw 1. The flaps 18 and the flaps 19 are respectively parallel to each other and the flaps 18 are perpendicular to the flaps 19. These flaps are respectively articulated in the hoops 20 and 21 fixed on the bracket supports 3a which extend beyond the lower part of the fairing 2 and can be inclined to the axis by the operation of control devices respectively actuated, one by the pitching pilot and the other by the rolling pilot (control devices not shown, pitching and rolling pilots shown in FIG. 4).

The automatic pilot ensures the control of the three degrees of freedom $x$, $y$ and $\psi$.

The pilot controlling the rotation $\psi$ (see FIG. 3) comprises a gyroscopic compass 30 and a manual course control 31, a signal corresponding to the deviation $\psi-\psi_0$ being successively applied to a phase-advance network 32 and to an amplifier 33. The signal delivered by the amplifier 33 is applied to the servo-motor 34, which actuates the compensating flaps 17.

The pilot controlling the tranlsation along $Ox$, identical with that controlling the translation along $Oy$ (see FIG. 4), comprises on the one hand an accelerometer 40 followed by an integrator 41, and on the other hand an infra-red detector 42 giving the position $x$ of the platform with respect to the ground and a manual control of turning 43 permitting a position $x_0$ to be fixed a priori, the signal $x-x_0$ together with the signal delivered by the integrator 41 being both applied to the amplifier-summation device 44, the output of this latter supplying a servo-motor 45 controlling the stabilizing flaps 18.

The stabilized captive platform operates as follows:

Being in its position on the ground as shown in FIG. 1, namely with the extremities of the rods 11 engaged in the cups 12 and the foldable suspension arms 6 and retaining arms 8 being extended, the lifting of the platform is carried out in the following manner: the prop-jet unit is started-up, and when it has reached its normal speed, the auxiliary motor 10 is started which causes the winch 9 to rotate; the cables 5 are unwound and the motor 10 is stopped when the platform has reached its height of utilization.

From the detected rotation $\psi$, the yaw pilot prepares the degree of inclination of the compensating flaps $a_z\psi+b_z\dot{\psi}$ to act in opposition of the rotation of the platform. By acting on the coefficient $a_z$ and $b_z$, on the one hand the rotation $\psi$ can be reduced and on the other hand the damping of the movements of rotation about the axis $Oz$ can be regulated.

In the amplifier-summation device 44, the pitching pilot prepares the law of inclination of the stabilizing flaps 18 from the data given by the accelerometer 40 and the integrator 41 on the one hand, and from the difference $x-x_0$ of the position of the platform with respect to the ground supplied by the infra-red detector 42 and by the hand inclination control 43 on the other hand. The law governing the inclination of the stabilizing flaps 18 can be expressed as follows:

$$\beta_x = a_x(x-x_0) + b_x\dot{x} + c_x\int_0^t (x-x_0)dt$$

in which the term $b_x\dot{x}$ corresponds to the inclination acting in opposition to the forces applied on the platform along the axis $Ox$, and in which the terms $$a_x(x-x_0) \text{ and } c_x\int_0^t (x-x_0)dt$$

are terms enabling the difference of position of the platform and the drift of the integrator or the error of the accelerometer to be corrected. The difference of position $x$ is given by an infra-red detector on the ground, and infra-red source on board the platform supplying, through an optical system mounted on the ground, an image in its focal plane. A caesium-silver cell supplies an electrical indication which enables the position of the platform to be defined.

The information $x$ supplied by the infra-red detector 42 may be displaced by the manual control 43 by a constant quantity $x_0$. This displacement has the effect of displacing the position of equilibrium of the platform by the quantity $x_0$. Manual control of the inclination thus enables the platform to be brought into a desired position.

It will of course be understood that the present invention has been described and illustrated only by way of explanation, and that it is possible to make modifications of detail without thereby departing from the scope of the invention.

I claim:

1. A stabilized flying platform unit of the kind having aerodynamic lifting means and being coupled to a base on the ground by a system of at least three parallel metal cables of equal length and not located in the same plane, said platform unit comprising: a rigid base fixed with respect to the ground, the fixing points of said three metal cables on said base and on said platform being respectively in a horizontal plane, thus eliminating three degrees of freedom of said platform, namely an upward translation and a rotation about each of two axes perpendicular to each other in said horizontal plane of the platform; means for detecting displacements corresponding to the remaining three degrees of freedom of said platform, namely a rotation about an axis perpendicular to said horizontal plane and a translation along two axes perpendicular to each other in said horizontal plane; control surfaces adapted to act respectively in opposition to said three possible displacements; servo-controls acting between each of said control surfaces in dependence on said means for detecting the corresponding displacements, said control surfaces thus acting in opposition to the possible remaining displacements.

2. A stabilized flying platform unit as claimed in claim 1, in which said means for detecting movements of said platform about an axis perpendicular thereto, and the serve-control between said detection means and the corresponding control surfaces form a yaw pilot unit, comprising a gyroscopic compass giving the course or head $\psi$, and a manual control giving the desired head $\psi_0$, a phase-advance network receiving the signal $\psi-\psi_0$ and having its output signal applied to an amplifier, and a servo-motor coupled to the output of said amplifier and actuating the corresponding control surfaces.

3. A stabilized flying platform unit as claimed in claim 1, in which said means for detecting movements of said platform along two axes thereof perpendicular to each other, and the servo-control between said detection means and the corresponding control surfaces each constitute the rolling pilot or the pitching pilot, comprising an accelerometer having its sensitive axis placed in the direction to be controlled by the automatic pilot, two integrators giving the speed and the displacement of said platform, a network for proportioning and summing-up the three signals of acceleration, speed and displacement, and a servo-motor supplied by said network and actuating the corresponding control surfaces.

4. A stabilized flying platform unit as claimed in claim 3, in which the integrator giving the displacement is replaced by a device comprising an infra-red detector on the ground, an infra-red source on said platform, having its image formed in the focal plane of said detector, a caesium cell giving a signal defining the position of said platform, and a manual control on the ground enabling said position with respect to the ground to be displaced.

5. A stabilized flying platform unit as claimed in claim 1, in which said aerodynamic lifting means comprise an air-screw driven by a prop-jet, rotating inside a fairing, said fairing having a cylindrical body flared towards the front and reinforced by external bracket supports extending beyond the lower edge of said fairing so as to receive two hoops, each supporting one of two sets of stabilizing flaps mounted in the discharge flow of said air-screw, compensating flaps being provided at the intake of said fairing in front of the air-screw.

References Cited in the file of this patent
UNITED STATES PATENTS

| | | |
|---|---|---|
| 2,948,489 | Miller | Aug. 9, 1960 |
| 2,980,365 | Yohe | Apr. 18, 1961 |
| 2,995,740 | Shreckengost | Aug. 8, 1961 |

FOREIGN PATENTS

| | | |
|---|---|---|
| 612,551 | Canada | Jan. 17, 1961 |